United States Patent [19]
Buettner et al.

[11] 4,225,167
[45] Sep. 30, 1980

[54] VEHICLE BUMPERS WITH COLLAPSIBLE PARTS

[76] Inventors: Carl F. Buettner, 9501 Pinespray, St. Louis, Mo. 63126; John S. Hill, 604 Plaza Dr., Joplin, Mo. 64801

[21] Appl. No.: 883,829

[22] Filed: Mar. 6, 1978

[51] Int. Cl.$^3$ .............................................. B60R 19/00
[52] U.S. Cl. ................................... 293/120; 293/133; 293/150; 293/155; 403/2
[58] Field of Search ................ 293/60, 70, 74, 75–78, 293/89, 96, 97, 98–101, 120–122, 133, 149–150, 151–155; 403/2; 280/704

[56] References Cited
U.S. PATENT DOCUMENTS

| | | | |
|---|---|---|---|
| 3,596,963 | 8/1971 | Phillips | 293/76 |
| 3,843,180 | 10/1974 | Alexander | 293/74 |
| 3,907,352 | 9/1975 | Spain et al. | 293/76 |

*Primary Examiner*—Douglas C. Butler
*Attorney, Agent, or Firm*—Charles B. Haverstock

[57] ABSTRACT

This invention relates to vehicle bumpers and more particularly to vehicle bumpers with frangible or resiliently collapsible parts which break-away or distort on impact to minimize the loss of control which often occurs when metal and other more usual types of bumpers bend on impact and puncture tires or produce undesirable braking action or become entangled with other parts of the vehicle. This invention is characterized by a vehicle bumper construction wherein at least a portion thereof is comprised of a frangible and collapsible or otherwise deformable end portion made of materials such as plastic impregnated fiber glass or rubberlike materials which extend in front of one or both of the vehicle wheels, which end portions may be attached to reduced length metal or wood bumpers and fracture and breakoff or distort on impact but do not bend into contact with other parts of the vehicle.

2 Claims, 5 Drawing Figures

VEHICLE BUMPERS WITH COLLAPSIBLE PARTS

There are many known bumper constructions for use on vehicles of various types but most of the known bumpers suffer from certain disadvantages and shortcomings including causing blowouts and loss of control of the vehicle on impact. The known devices for the most part are also relatively complicated structurally and expensive to make and install. These disadvantages and shortcomings are especially serious as they relate to bumpers used on larger vehicles such as trucks, buses and the like. The closest known prior art to the present construction are those devices disclosed in U.S. Pat. Nos. 3,820,834, 3,823,968, 3,843,180, 3,844,517 and 4,050,689.

U.S. Pat. No. 3,820,834 discloses a three part bumper supported on a vehicle frame by means of springs. Cantilever-like projections are joined to the outer portions of a central spring loaded bumper section and are held in alignment by means of heavy springs or hydraulic systems. Impact against an end of such a bumper tends to compress the outer projections of the bumper against the action of the springs or hydraulic system so that the projecting portions function like shock absorbers.

U.S. Pat. No. 3,823,968 discloses a bumper for vehicles wherein the bumper includes portions guided in the horizontal plane by scissor-like devices having vertical joints which are connected between the support structure and the bumper. The jointed scissor devices are rigid in the vertical direction but yieldable in the horizontal plane in case of impact. The scissor-like structures are disclosed as being held in place by means of tie rods, tension springs, hydraulic systems, and the like. Such devices are structurally complicated and expensive, and are susceptible to many of the disadvantages mentioned above.

U.S. Pat. No. 3,843,180 discloses a safety-type bumper for use on motor vehicles such as trucks which is characterized by having complementary spring biased end sections pivotally or hingedly mounted on the respective ends of the main body of the bumper. The end portions of this bumper construction may be hingedly attached to the outer ends of the main section by shear pins or bolts which hold the parts together under normal service conditions but allow collapsing of the bumper parts when impacted during collision. This construction is also costly and complicated and has many of the disadvantages discussed above.

U.S. Pat. No. 3,884,517 discloses another bumper construction having end or wing sections coupled to a main bumper section by pins which shear on impact against the wing sections. This construction is further complicated by including tethering cables which prevent the wing sections from falling completely loose when the pins are sheared.

The construction disclosed in U.S. Pat. No. 4,050,689 is a pneumatic flexible bumper characterized by having a plurality of individual chambers defined by a resiliently deformable outer bumper shell. The air chambers are provided and defined by supporting elastomeric members separated by elements designed to create a preloading affect which maximizes the resistance to buckling. The elastomeric members are constructed from materials such as dense urethane foam or rubber and are intended to return to their original configuration after impact.

None of the above discussed patents discloses or suggests a bumper that has the main novel features of the present invention which reside in a bumper having frangible and collapsible or resilient end parts, which bumper is structurally and operationally simple and inexpensive. Furthermore, none of the prior art devices is adaptable to being used in conjunction with a shortened portion of a bumper such as a bumper of known construction.

This invention relates to bumpers especially adaptable for use on heavy vehicles such as semi-trailers and other types of trucks and on buses. Bumpers used on trucks and buses serve some purposes that are different from the bumpers used on passenger cars and other smaller vehicles. For example, truck and bus bumpers are usually supported on the vehicle on relatively heavy structural members. The usual truck and bus bumper may measure up to 8 feet or longer in length to extend across the full front or rear including extending in front of and behind the tires. These heavy duty bumpers are designed to (1) protect the bottom of the radiator tank and shutter controls, (2) add strength to the front crossmembers which ties the frame rails together, (3) direct water spray and road debris downwardly toward the road surface in front and under the vehicle, (4) reduce the volume of road spray that is able to enter the engine compartment, (5) provide for the mounting of the license plates, road lights, fog lamps, and other accessories and appurtenances, (6) provide a step for use in checking the water level in the radiator, washing the windshield and for other maintenance, (7) protect the cab skirts and head lamps from damage caused by minor impacts, and, (8) improve the overall appearance of the vehicle.

Statistically, the most vulnerable spot on any moving road vehicle, including trucks and buses, is the left front which is the corner of the vehicle in front of the driver. Many collisions cause the left front portion of the usual metal bumper to bend rearwardly where it moves against and damages or blows the left front tire or drags on the tire producing a braking action which causes the vehicle to turn to the left into the oncoming lane and causes the driver to lose control. The loss of control of the vehicle substantially increases the possibility for further damage from a collision, especially since the braking and other action is more often than not in a direction to divert the vehicle into the adjacent lane and into the lane of oncoming traffic and also causes jackknifing.

A preferred form of the present invention is characterized by a bumper construction that has frangible collapsible end portions which break off and fall clear on impact, and in so doing this greatly reduces the danger of blow outs and the possibility that the driver will lose control of the vehicles due to a blow out or due to a bent bumper causing undesirable braking action or other damage to the vehicle. Thus with the present bumper construction the driver of a truck or bus has a much better chance to avoid aggravating a bad situation. This may also reduce damage, injury, and loss of life when an accident occurs. The practice of the present invention is to provide a substantially verticle shear plane in a bumper at a location or locations spaced from one or both ends of the bumper where the bumper will break-away on impact without bending or twisting. Such shear planes are usually about 12 to 18 inches from the ends of the bumpers and the bumper, including especially the end portions thereof are fabricated from a frangible material such as plastic impregnated fiber glass or other comparable frangible materials which materials are characterized by being relatively strong but which will break-off rather than bend when impacted. The entire bumper or only the end portion may be fabricated from such materials.

The safety features inherent in the practice of the present invention include:

(1) providing a bumper that has one or more shear planes spaced inwardly from the ends thereof in such a way as to cause the end portions of the bumper to break-off at the shear planes on impact rather than bending, thereby eliminating the possibility that the bumper will bend against the tire or other vehicle parts and possibly cause a puncture or produce a dragging action on the tire that generates braking and loss of control of the vehicle;

(2) providing a bumper that has sufficient strength and resiliency to withstand minor impacts without damage to the vehicle or to the bumper;

(3) constructing a bumper from materials that can be made in various colors and designs and which can be made to have fluorescent and other safety color characteristics and which does not require painting or other upkeep;

(4) providing a bumper construction which may make use of a shortened portion of an existing bumper such as by being positioned inside of a full length bumper formed of a frangible collapsible material; and, (5) providing a bumper which enables the usual metal or wood bumper to continue to be used but in a shortened condition thereby simplifying the installation of the subject construction.

The present construction also lends itself to having the usual lights, licenses and other applicances attached to it and the subject bumper should be made to be strong enough to serve the usual purposes such as to support a man's weight during maintenance and cleaning operation.

The present construction can be constructed to be used with many existing types of truck and bus bumpers as well as with automobile bumpers and the like and it can be made to have different shapes and thicknesses and the present constructions are adaptable to being constructed in many different ways including in a molding process using relatively available materials such as plastic impregnated fiber glass and other plastic and plastic-like substances, and it can be made of rubber or rubber-like substances, all of which are relatively easy to drill into and cut for attached applicances and other purposes.

It is therefore a principal object of the present invention to provide a bumper construction having frangible collapsible end portions which are adapted to shear off or break loose as distinguished from bending or twisting on impact.

Another object is to provide a bumper construction which can be used with existing, but shortened, versions of known bumper constructions.

It is another object of the present invention to teach the construction of a relatively simple and inexpensive bumper construction.

Another object is to minimize the possibility of puncturing or undesirably braking a tire during a collision.

Another object is to teach the construction of a bumper which is relatively easy to replace and maintain.

Another object is to minimize the damage resulting from an accident involving a road vehicle.

Another object is to increase the possibility that a vehicle involved in an accident will be driveable and controllable after the accident.

Another object is to provide a bumper construction for a vehicle which is particularly adaptable for use on trucks, buses and other relatively heavy vehicles.

Another object is to make the roads and highways safer.

These and other objects and advantages of the present invention will become apparent after considering the following detailed specification in conjunction with the accompanying drawing wherein.

Figure 1:
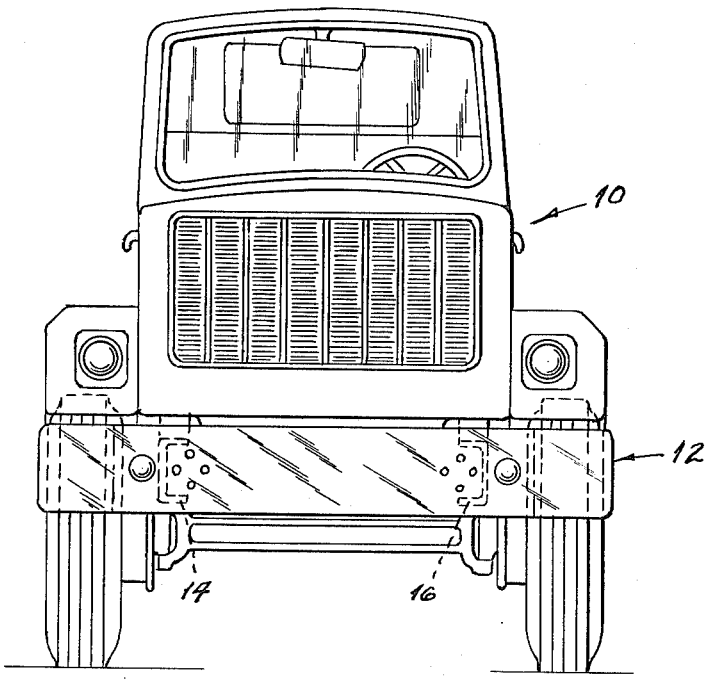
FIG. 1 is a front elevational view of a truck equipped with a bumper constructed according to the teachings of the present invention.

Referring to the drawing more particularly by reference numbers, the number 10 in FIG. 1 identifies a truck or other vehicle equipped with a bumper 12 constructed according to the present invention. The bumper 12 is shown mounted at the front end of the vehicle 10 and is attached thereby by bolts or other fasteners which attach the bumper to spaced vehicle support members 14 and 16 in the usual way. The bumper 12 as more clearly shown in FIG. 2 basically is of two-piece construction including a regular but shortened metal or wood bumper portion 18 which is attached to the vehicle and a second bumper portion 20 which is mounted on, over or around the portion 18. The details of the member 20 are shown more particularly in FIGS. 2 and 3.

Figure 2:
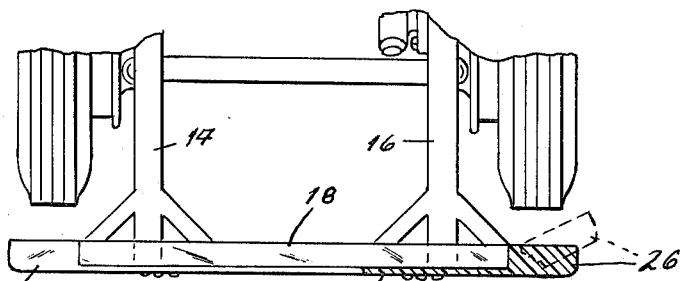
FIG. 2 is a fragmentary top plan view, partly in section, showing the front end of a truck equipped with a bumper constructed according to the present invention.

The bumper portion 18 is shorter in length than the usual bumper that is installed on vehicles so as not to extend across, in-front, or behind the tires on opposite sides of the vehicle. In fact, the bumper portion 18 may be even shorter than is shown in FIG. 2 to extend only to the support members 14 and 16. The reason for this is that in case of an impact or collision, it is important that the bumper portion 18 not extend sidewardly far enough so that it could possibly bend backwardly against the tire or other adjacent vehicle portions to cause damage such as to blow-out or brake the wheel or damage other parts. The bumper portion 20, on the other hand, is longer than the portion 18 and is preferably formed of a frangible and collapsible material, and in the construction as shown it has a central relatively thin portion 22 which is positioned adjacent to the short bumper portion 18, and two spaced connected end portions 24 and 26. The portions 22, 24 and 26 are constructed to define a space 28 on one side which is large enough to fit over or receive therein the shortened bumper portion 18. It is important to note that the portions 24 and 26 extend beyond the ends of the bumper portion 18 in order to establish a full length bumper that extends across the front end of the vehicle as clearly shown in FIGS. 1 and 2.

The bumper portion 20 is formed of a relatively frangible and breakable material and the end portions 24 and 26 form shear planes or shear edges at the locations of the respective ends of the bumper portion 18. This is very important because it means that if the bumper 12 is impacted by colliding with another vehicle or object adjacent to either of its ends, the force of the impact, if sufficient as occurs during a collision, will cause the impacted end portion 24 or 26 to shear or break-off at the location of the associated shear plane. This will usually occur at the location of the respective end of the shorter bumper portion 18. By being of a relatively frangible and breakable material, the bumper portion 20 is incapable of any substantial amount of bending but will crack-off or break-off usually at one of the places indicated. This is to be contrasted with the usual type bumper which is entirely like the portion 18 except that the usual bumper will have the portion 18 extend across the full front (or rear) end of the vehicle so that on impact the impacted end portion will bend into the tire and other adjacent parts of the vehicle causing braking action of the vehicle or rupturing or puncturing of the tire. These conditions tend to cause the driver to lose control over the vehicle and causes the vehicle to turn in the direction in which the braking action or puncture occurs. For example, if the front tire on the driver's side is ruptured or braked it is expected that the vehicle will turn or tend to turn into the adjacent lane to the driver's left or into the oncoming traffic in the case of two-way traffic. If the turning is too sever it may also cause the vehicle to jackknife. On the other hand, if the opposite end of the front bumper should be impacted, which is less likely though possible, the vehicle will tend to be turned toward the side of the road.

Figure 3:
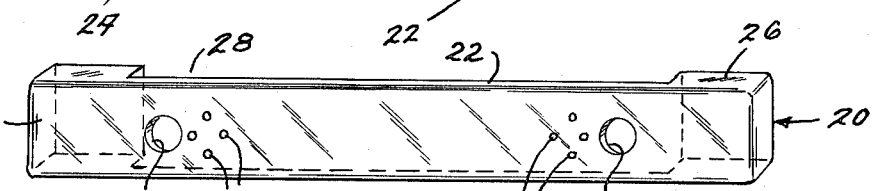
FIG. 3 is a perspective view of a portion of the bumper construction shown in FIGS. 1 and 2.

In the construction shown in FIGS. 1–3 the bumper portion 20 is provided with holes 32 that accommodate lights or other accessories, and with other holes 34 and 36 which receive fasteners used for attaching the bumper portion 20 to the bumper portion 18. The bumper portion 20 can also be provided with means for attaching a license plate and other accessories as well. Furthermore, the bumper portion 20 should be constructed of material that is strong enough to withstand considerable impact without breaking and it should be strong enough to support a relatively considerable load such as a man's weight when standing on the bumper to clean the windshield or perform other operations.

It is possible to make the subject bumper construction 20 in different sizes, shapes and constructions without changing the nature and scope of the invention. For example, the bumper portion 20 could be constructed to have portions that extend along the upper and lower surfaces of the bumper portion 18, it could be constructed to be of equal thickness from end-to-end rather than having the enlarged end portions 24 and 26 since the portion 20 is designed to break-off at the ends of the portions 18, and the bumper portion 20 can be made in different thicknesses and different widths and can be made of many different frangible collapsible materials such as those indicated. It can also be impregnated during construction with coloring materials and with particles of light reflecting material for safety and decoration purposes.

Figure 4:
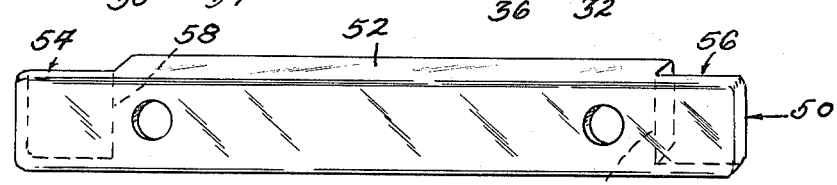
FIG. 4 is a perspective view showing another embodiment of the subject bumper construction; and, FIG. 5 is a perspective view showing still another embodiment of the subject bumper construction.

FIG. 4 shows another embodiment 50 of the subject bumper construction wherein central portion 52 which is relatively thick transversely in relation to the integral end portions 54 and 56. In this construction, the central portion 52 is attached directly to the front of the vehicle with or without requiring a regular bumper portion such as the bumper portion 18 shown in FIG. 2. In the case of the bumper 50 the end portions 54 and 56 are connected to the central portion 52 as shown so that on impact the portions 54 and 56 will break-off at the locations 58 or 60, respectively. The construction shown in FIG. 4 can also be constructed to be hollow so as to receive a bumper portion such as the bumper portion 18 therein. In either case, the operation will be the same and on impact the end portions will be sheared off instead of being bent or twisted. The length of the end portions 54 and 56 can be selected as desired and as necessary depending upon the amount to be sheared on impact.

Figure 5:
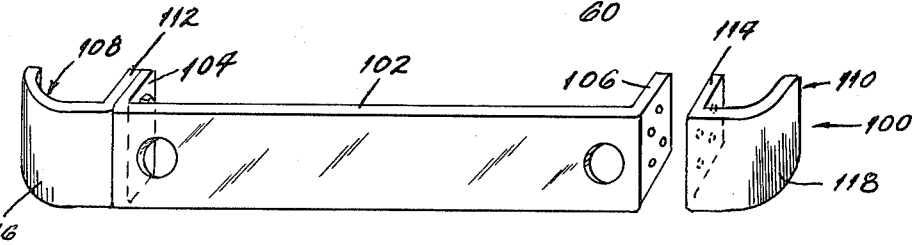

FIG. 5 shows yet another embodiment 100 which includes a central portion 102 with flanged end portions 104 and 106. The length of the portion 102 is selected to correspond to the length of a portion such as the portion 18 in FIG. 2. In the construction of FIG. 5 the end flanges 104 and 106 are connected to separate members 108 and 110 which are shown as flanged members having respective first flanges 112 and 114 which are attached to the flanges 104 and 106 by suitable fastener means such as bolts and the like, and the members 108 and 110 have other flange portions 116 and 118 which extend endwardly and rearwardly to form the end portions of the bumper construction 100. The members 108 and 110 may be constructed of a frangible breakable material such as in the constructions shown in FIGS. 1-4 or they may be constructed of a material such as relatively stiff but somewhat flexible substance such as a relatively stiff rubber or rubber-like material capable of bending to some extent without breaking. In any case, however, the members 108 and 110 should not be capable of moving into contact with the associated vehicle wheels to produce a rubbing or braking action on the wheel or to rupture or puncture the tire. The shape and the dimensions of the various parts used in the bumper construction 100 can be varied as desired without departing from the spirit and scope of the invention, and it is contemplated that the members 108 and 110 be made of a material capable of yielding without breaking under some loads but capable of breaking when greater forces are applied.

Thus it is apparent that there has been disclosed and described several different embodiments of a bumper construction, and particularly a bumper construction for use on relatively large vehicles such as on trucks and buses which fulfills all of the objects and advantages sought therefor. It will be apparent to those skilled in the art, however, that many changes, modifications, variations, and other uses and applications of the subject bumper construction are possible. All such other changes, modifications, variations and other uses and applications which do not depart from the spirit and scope of the invention are deemed to be covered by the invention which is limited only by the claims which follow.

What is claimed is:

1. A safety bumper construction for trucks and other like vehicles having body portions and spaced front and rear wheel assemblies comprising a first member which is approximately as long as the width of the vehicle body on which it is to be installed, and a second member adapted to be mounted on the first member, said second member being longer than the first member and having end portions which extend beyond at least one end thereof and in front of at least one of said vehicle wheel assemblies, said second member being formed of a relatively rigid but frangible material whereby the endwardly projecting portion thereof is much more likely on impact to fracture and break-off than to bend.

2. A safety bumper for vehicles comprising a member having first and second connected portions, said first portion having opposite ends, being constructed of a relatively rigid material and being substantially shorter than the width of the vehicle on which it is to be installed, said second portion including a central section overlaying the first portion and having opposite end sections attached to the central section and extending endwardly beyond the respective opposite ends thereof, said second portion being formed of a relatively rigid but frangible material which on impact is more likely to break-off adjacent to at least one of the opposite ends of the first portion than to bend.

* * * * *